United States Patent [19]

Suzuki

[11] Patent Number: 5,202,881
[45] Date of Patent: Apr. 13, 1993

[54] INFORMATION STORAGE MEDIUM

[75] Inventor: Katsumi Suzuki, Tokyo, Japan

[73] Assignee: Kabushiki Kaisha Toshiba, Kawasaki, Japan

[21] Appl. No.: 825,817

[22] Filed: Jan. 21, 1992

Related U.S. Application Data

[63] Continuation of Ser. No. 535,523, Jun. 11, 1990, abandoned.

[30] Foreign Application Priority Data

Jun. 30, 1989 [JP] Japan .................. 1-169610
Jun. 30, 1989 [JP] Japan .................. 1-169611
Jun. 30, 1989 [JP] Japan .................. 1-169612

[51] Int. Cl.$^5$ ............................................ G11B 3/84
[52] U.S. Cl. .................................... 369/284; 369/283; 369/286; 369/288
[58] Field of Search ............... 369/275.1, 275.2, 275.3, 369/283, 284, 288, 286; 428/64, 65, 76, 209, 457, 913

[56] References Cited

U.S. PATENT DOCUMENTS

| | | | |
|---|---|---|---|
| 4,268,575 | 5/1981 | Shinozaki et al. | 369/283 |
| 4,638,335 | 1/1987 | Smith et al. | 369/284 |
| 4,647,944 | 3/1987 | Gravesteijn et al. | 346/1.1 |
| 4,707,820 | 11/1987 | Sawamura | 369/284 |
| 4,710,899 | 12/1987 | Young et al. | 369/284 |
| 4,752,554 | 6/1988 | Sato et al. | 369/284 |
| 4,803,660 | 2/1989 | Kobayashi et al. | 369/284 |
| 4,839,207 | 6/1989 | Yoshitomi et al. | 369/284 |
| 4,839,883 | 6/1989 | Nagata et al. | 369/283 |
| 4,900,598 | 2/1990 | Suzuki | 369/288 |
| 4,908,250 | 3/1990 | Gotoh et al. | 369/288 |
| 4,947,372 | 8/1990 | Uoshino et al. | 369/284 |
| 4,954,379 | 9/1990 | Nishida et al. | 369/288 |
| 5,024,927 | 6/1991 | Yamada et al. | 369/100 |

FOREIGN PATENT DOCUMENTS

0184452 6/1986 European Pat. Off. .
64-7346 1/1989 Japan .

*Primary Examiner*—Eugene R. LaRoche
*Assistant Examiner*—Tan Nguyen
*Attorney, Agent, or Firm*—Foley & Lardner

[57] ABSTRACT

An information storage medium comprises a substrate and a recording layer supported on the substrate and subjected to reversible and selective phase transformation between different phases, by changing the conditions under which a light beam is radiated. The recording layer contains an alloy represented by $(In_{100-x}Sb_x)_{100-y}Te_y$ (where x and y are in atomic %, $45 \leq x \leq 50$, and $25 \leq y \leq 45$).

21 Claims, 9 Drawing Sheets

INFORMATION STORAGE MEDIUM

This application is a continuation of application Ser. No. 07/535,523, filed Jun. 11, 1990, abandoned.

BACKGROUND OF THE INVENTION

1. Field of the Invention

The present invention relates to an information storage medium such as an optical disk, which causes a phase transformation between crystalline and amorphous phases in a recording layer upon irradiation by a light beam such as a laser beam, thereby recording or erasing information.

2. Description of the Related Art

As a conventional information erasable optical disk, a phase-transformation type optical disk is known. In the phase-transformation type optical disk, an irradiated portion of a recording layer is reversibly changed between two different structural states by changing the radiation conditions of the laser beam to be radiated onto the recording layer, thereby recording/erasing information.

As materials of the optical disk, semiconductors, semiconductor compounds, and intermetallic compounds such as Te, Ge, TeGe, InSe, SbSe, SbTe, and the like are known. Each material can have two states, i.e., crystalline and amorphous phases, according to the radiation conditions of a laser beam, and has different complex refractive indices $N = n - ik$ in these states. An idea for realizing an erasable optical memory by reversibly changing the state of a laser beam irradiated portion of a recording layer between crystalline and amorphous states by thermal treatment with a laser beam is proposed by S. R. Ovshinsky, et al. (Metallurgical Transactions 2, 641 (1971)). According to this idea, the irradiated portion is selectively set in one of the crystalline and amorphous states according to the radiation condition of the laser beam, and these two states are distinguished by a difference in refractive index upon irradiation by a reproduction laser beam, thereby reproducing information. When information is to be recorded, a laser beam having a small pulse width is radiated on the recording layer at a high power capable of heating the radiated portion to a temperature exceeding its melting point so as to melt the radiated portion, and the radiated portion is rapidly cooled, thereby forming an amorphous recording pit. When the recorded information is to be erased, a laser beam having a relatively large pulse width is radiated on the recording layer at a power capable of heating the radiated portion to a temperature exceeding its crystalline temperature, and the radiated portion is gradually cooled, thus returning the recording pit to a crystalline state.

Recording/erasure of information is performed by a two-beam method using a laser beam forming a circular spot used for rapid-cooling amorphization, and an erasure laser beam forming an elliptic spot used for gradual-cooling crystallization.

However, the two-beam method complicates the optical system. In particular, since it is difficult to track an elliptic spot along the spiral track of a disk, a complicated tracking mechanism is required.

Thus, extensive studies concerning a one-beam method for performing recording and erasure by one laser beam have been carried out. In the one-beam method, in principle, an overwrite operation can be easily performed in which a laser beam radiated from a single laser is power-modulated between two power levels $P_E$ (erasure) and $P_W$ (recording) ($P_W > P_E$), thereby overwriting new information while erasing recorded information. A method of performing the overwrite operation by one beam in this manner is called a one-beam overwrite method. The one-beam method can also eliminate other drawbacks of the two-beam method.

When the one-beam overwrite method is applied to a phase-transformation type recording layer, the following difficulty is involved. More specifically, whether a beam radiated portion of the recording layer is set in an amorphous or crystalline state is determined by only the power level of a radiated laser beam. Therefore, gradual-cooling crystallization cannot be performed in an information erasure mode. More specifically, crystallization must be performed within a period of time as short as that for amorphization. When information is recorded, since the power level of a recording beam is superimposed on an erasure power level, a portion around the portion on which an amorphous recording pit is to be formed is heated by a laser of an erasure power level, and is difficult to be rapidly cooled, thus disturbing formation of the amorphous recording pit.

In this manner, since the one-beam overwrite operation has difficulty in a phase-transformation type recording layer, a recording layer material which can realize the one-beam overwrite operation has not yet been found.

SUMMARY OF THE INVENTION

The present invention has been made in consideration of the above situation, and has as its object to provide an information storage medium which can receive a one-beam overwrite operation and has good relevant characteristics.

An information storage medium according to an aspect of the present invention comprises a substrate and a recording layer which is subjected to reversible and selective phase transformation between crystalline and amorphous phases according to the radiation conditions of a light beam, the recording layer containing an alloy represented by $(In_{100-x}Sb_x)_{100-y}Te_y$ (wherein x and y are in atomic %, $45 \leq x \leq 50$, and $25 \leq y \leq 45$).

An information storage medium according to another aspect of the present invention comprises a substrate, a recording layer subjected to reversible and selective phase transformation between crystalline and amorphous phases according to the radiation conditions of a light beam, and a protective layer provided between the substrate and the recording layer and/or on the recording layer, the recording layer containing an alloy represented by $(In_{100-x}Sb_x)_{100-y}Te_y$ (wherein x and y are in atomic %, $45 \leq x \leq 52$, and $25 \leq y \leq 45$), and the protective layer having a thermal conductivity of ⅓ or more of that of the recording layer.

An information storage medium according to still another aspect of the present invention comprises a substrate, a recording layer subjected to reversible and selective phase transformation between crystalline and amorphous phases according to the radiation conditions of a light beam, and a protective layer provided between the substrate and the recording layer and/or on the recording layer, the recording layer containing an alloy represented by $(In_{100-x}Sb_x)_{100-7}Te_y$ (wherein x and y are in atomic %, $45 \leq x \leq 52$, and $25 \leq y \leq 45$), and the protective layer containing crystalline materials.

BRIEF DESCRIPTION OF THE DRAWINGS

A more complete appreciation of the invention and many of the attendant advantages thereof will be readily gained by reference to the following detailed description, considered in connection with the accompanying drawings, of which.

DETAILED DESCRIPTION OF THE PREFERRED EMBODIMENTS

Figure 1:
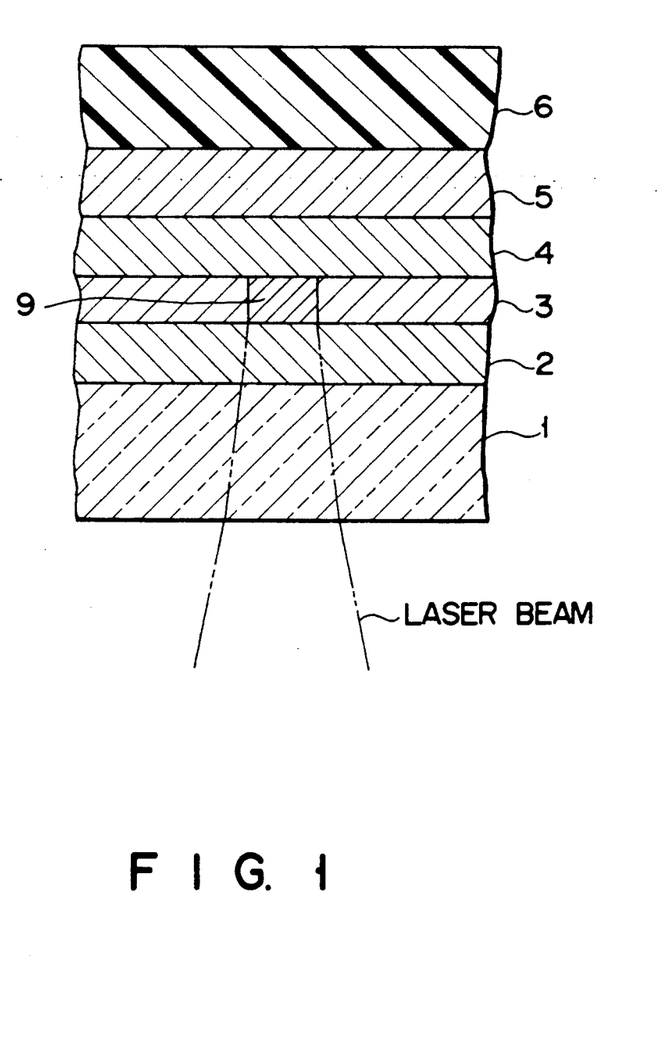
FIG. 1 is a sectional view showing an information storage medium according to an embodiment of the present invention.

The present invention will be described in detail below. FIG. 1 is a sectional view showing an information storage medium according to an embodiment of the present invention. A substrate 1 is formed of a transparent material whose characteristics do not change greatly over time, e.g., glass or a resin such as polycarbonate.

A protective layer 2, a recording layer 3, a protective layer 4, a reflection layer 5, and a resin layer 6 are formed on the substrate 1 in that order.

The protective layers 2 and 4 are formed of an inorganic dielectric material, and have the following functions:

(1) preventing a radiated portion from being evaporated to form a hole when a laser beam is radiated onto the recording layer 3;

(2) controlling the temperature of the recording layer 3 to cause desired phase transformation when a laser beam is radiated onto the recording layer 3; and (3) enhancing a reproduction signal by utilizing optical interference.

The reflection layer 5 is formed of a metal such as Au or Al, and has as its function the ability to reflect a reproduction laser beam and enhance a reproduction signal in cooperation with the protective layer 4.

The resin layer 6 is formed of, e.g., an ultraviolet-curable resin, and its function is to prevent formation of scratches.

Note that the protective layers 2 and 4, the reflection layer 5, and the resin layer 6 are preferably formed but need not always be formed. In some instances, only one of the protective layers 2 and 4 may be formed.

Figure 2:
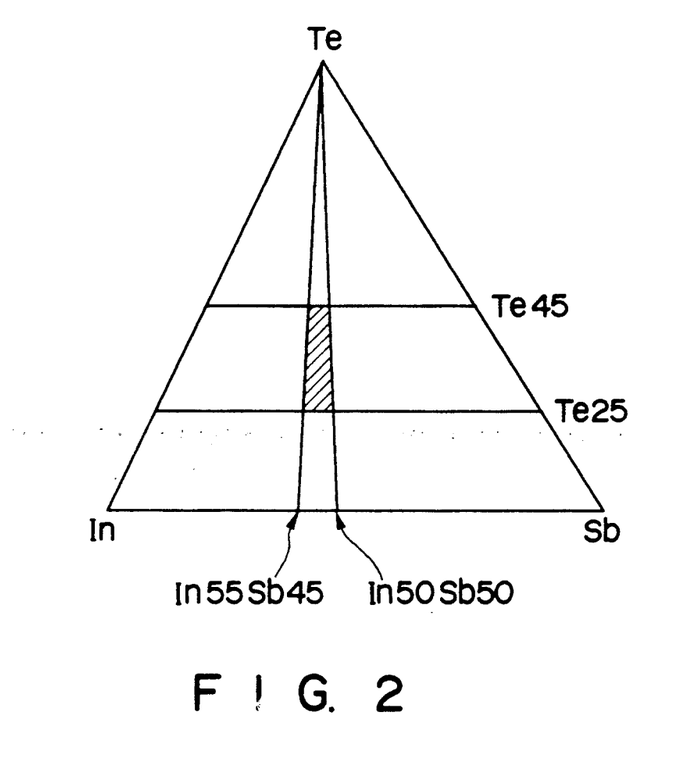
FIG. 2 is an In-Sb-Te composition chart of the recording layer composition of the information storage medium according to the present invention.

The recording layer 3 contains an alloy having a composition represented by $(In_{100-x}Sb_x)_{100-y}Te_y$ (wherein x and y are in atomic %, $45 \leq x \leq 50$, and $25 \leq y \leq 45$). This composition falls within the hatched range in FIG. 2, and an alloy having this composition can satisfy the requirements of high-speed crystallization and amorphous transformation, and allow a one-beam overwrite operation. The reason for this will be described below.

In an In-Sb alloy, it has already been known that an $In_{50}Sb_{50}$ intermetallic compound has a very short crystallization time. According to the experiments of the present inventors, the crystallization time was 45 nsec. Therefore, a composition based on the $In_{50}Sb_{50}$ intermetallic compound can allow high-speed crystallization. In a composition having a larger Sb content than that of the $In_{50}Sb_{50}$ intermetallic compound, Sb is excessively precipitated, resulting in very slow crystallization. In contrast to this, if a composition has a large In content, such a phenomenon does not occur. Therefore, not only in the $In_{50}Sb_{50}$ intermetallic compound but also in compositions having a slightly larger In content, a crystallization time can be shortened. More specifically, if a composition is prepared based on an alloy in which x falls within the range of $45 \leq x \leq 50$ in $In_{100-x}Sb_x$, high-speed crystallization is attained. However, it is difficult for an alloy having such a composition to achieve amorphous transformation, since its crystallization time is short. As a result of examinations by the present inventors, it was found that when Te, as one chalcogen element which allows easy amorphous transformation, is added within the range of 25 to 45 atomic %, amorphous transformation is facilitated, and the effect of pure Te with a short crystallization time (about 15 nsec) is obtained, thus maintaining high-speed crystallization. Therefore, a recording layer 3 with the above-mentioned composition would satisfy the requirements of high-speed crystallization and amorphous transformation, and the one-beam overwrite operation could be realized.

In order to improve one-beam overwrite characteristics, the protective layers 2 and 4 are preferably formed of a material having a heat conductivity of ⅓ or more that of the recording layer 3.

When such protective layers 2 and 4 are formed, temperature control of the recording layer can be effectively performed (i.e., a laser beam radiated portion of the recording layer 3 can be immediately cooled), thus remarkably improving overwrite characteristics. Since the thermal conductivity $k_h$ of an InSbTe alloy is about 0.17 W/cm.°C., materials satisfying the above-mentioned conditions include $MgF_2$ having a thermal conductivity of about 0.1 W/cm.°C., $Al_2O_3$ of about 0.2 W/cm.°C., AlN of about 0.22 W/cm.°C., and the like.

From the same point of view, the protective layers 2 and 4 are preferably formed of crystalline materials. Thus, temperature control of the recording layer 3 can also be performed effectively, thus remarkably improving the overwrite characteristics.

In general, a recording layer is formed by a thin film formation technique such as sputtering, as is a protective layers. However, if both the recording layer and the protective layers are formed by sputtering, these layers rapidly cool when they are deposited on a substrate, forming layers which normally become amorphous.

An amorphous recording layer is initially crystallized upon radiation of a laser beam when the medium having the recording layer is used. However, since dielectric materials normally used as a protective layer have a very high crystallization temperature, an amorphous protective layer is directly used. However, thermal conductivity as a general physical value in an amorphous state is about 1/10 less than that in a crystalline state. Therefore, if the protective layers 2 and 4 are in an amorphous state, the recording layer cannot be rapidly cooled, and sufficient overwrite characteristics may not be obtained. If the protective layers 2 and 4 can be in their crystalline states, the above drawbacks can be avoided. The protective layer materials which can be formed into films in their crystalline states by a thin film technique such as sputtering include $CeO_2$, $PbO$, $ZnS$, $MgF_2$, and the like. Of these materials, $CeO_2$ is most preferable.

$CeO_2$ has a thermal conductivity $k_h$ as high as about 0.08 W/cm.°C., and is about ½ that (0.17 W/cm.°C.) of an InSbTe alloy. Thus, a good temperature control effect can be obtained.

The thickness of the recording layer 3, the protective layers 2 and 4, the reflection layer 5 and the resin layer 6 preferably fall within the range of 50 Å to 2000 Å, 100 Å to 5000 Å, 50 Å to 5000 Å, and 1 μm to 50 μm respectively.

A method of manufacturing the information storage medium with the above-mentioned structure will be described below. The suitably-shaped substrate 1 (disk-like shape for an optical disk) is placed in the vacuum chamber of a sputtering apparatus, and the interior of the chamber is evacuated to a high vacuum. An argon gas is then introduced into the chamber, and argon sputtering is executed using a target formed of the material to be used as a protective layer. Thus, the protective layer 2 is formed o the substrate 1.

Three-element co-sputtering of targets formed of constituting elements of the recording layer, or sputtering of an alloy target adjusted to the composition of the recording layer to be obtained in advance is executed while the atmosphere in the chamber remains the same as the atmosphere for the protective layer formation, thus forming the recording layer 3.

Thereafter, the protective layer 4 is formed in the same manner as the protective layer 2. A desired metal target is sputtered to form the reflection layer 5.

Thereafter, the substrate is removed from the sputtering apparatus, an ultraviolet-curable resin is applied on the reflection layer 5 by spin-coating, and an ultraviolet ray is radiated on the applied resin to form the resin layer 6.

Thus, the information storage medium shown in FIG. 1 can be obtained.

Initialization, and overwrite and reproduction operations of information of the information storage medium obtained in this manner will be described below.

INITIALIZATION

Since the recording layer 3 is normally in an amorphous state as deposited, the recording layer 3 is continuously irradiated with a laser beam and is heated beyond crystallization temperature to allow formation of an amorphous recording mark. Thereafter, the recording layer is gradually cooled so as to be transformed to a crystalline state.

RECORDING (OVERWRITING)

Figure 3:
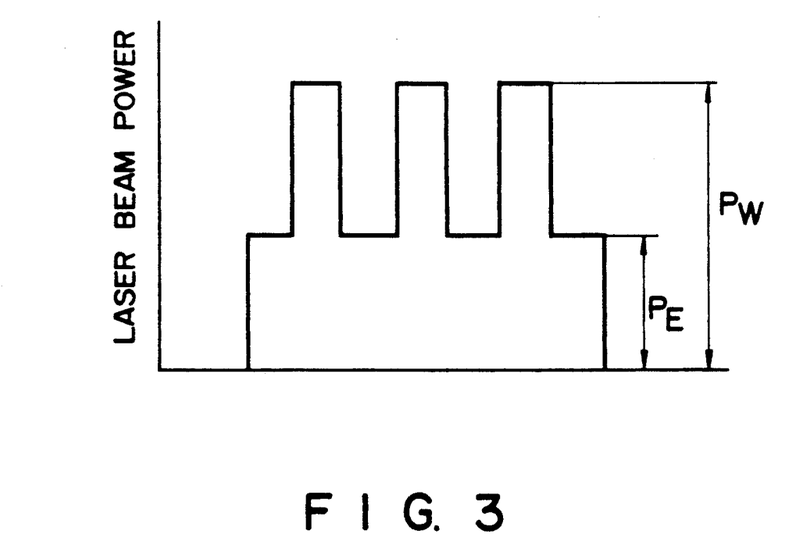
FIG. 3 is a graph showing the power of a laser beam when a single-beam power modulation overwrite operation is performed.
Figure 4:
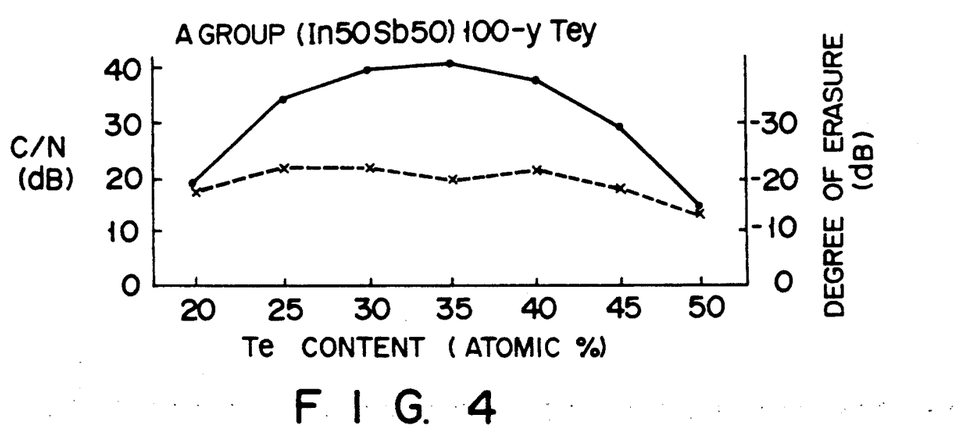
FIGS. 4 to 8 are graphs showing the relationships between recording layer compositions and overwrite characteristics in Experimental Example 1.
Figure 5:
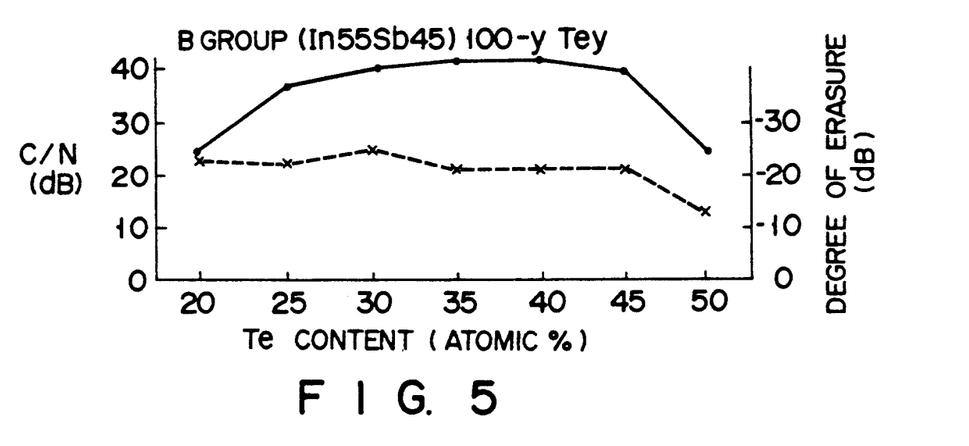
Figure 6:
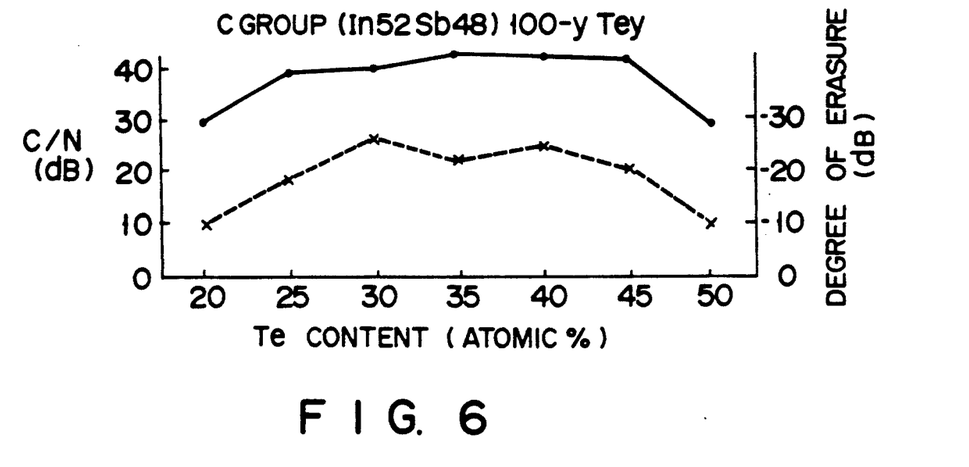
Figure 7:
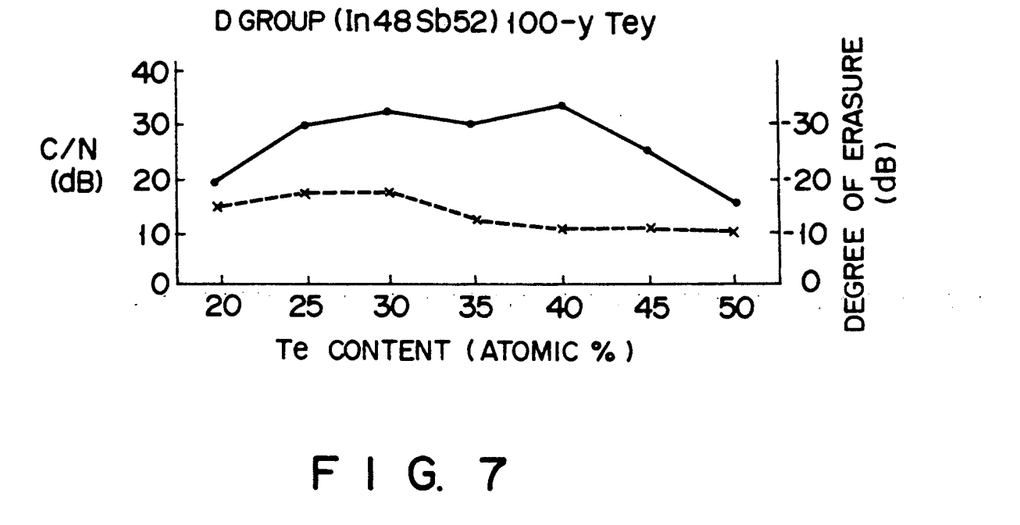
Figure 8:
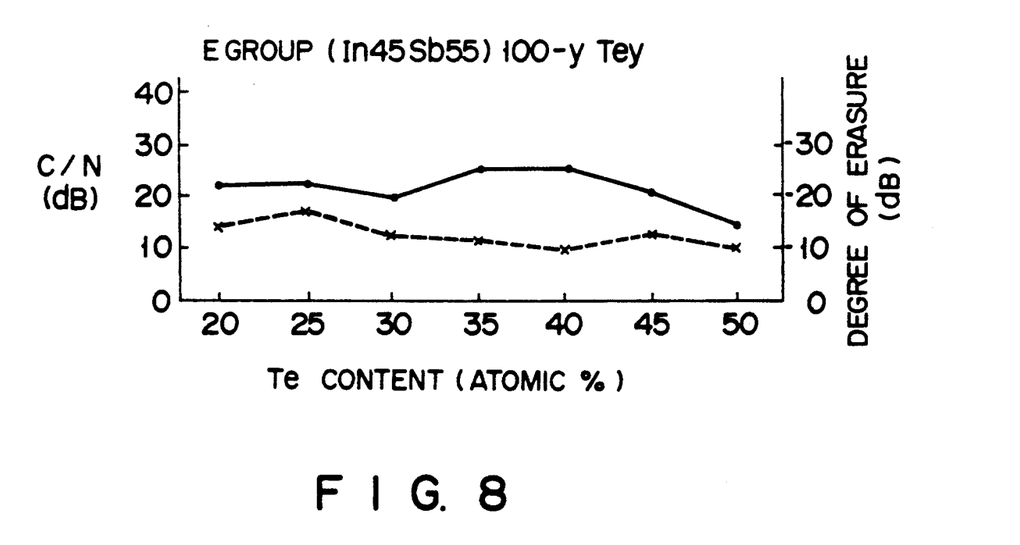

When information is to be recorded, a laser beam is power-modulated between a high recording level $P_W$ and an erasure power level $P_E$, lower than the recording level, as shown in FIG. 3, and is radiated onto the recording layer 3. In the first recording, only a recording operation is performed by the laser beam of the level $P_W$ to form a recording mark 9 in the recording layer 3. From the second recording, new information is overwritten while erasing recorded information by the laser beam of the level $P_E$. In an optical disk, the disk is rotated at a predetermined speed, and a recording beam of the power level $P_W$ is radiated onto a region to be overwritten. A portion onto which no recording beam is radiated is irradiated with the beam of the erasure power level $P_E$. Thus, in the portion irradiated with the beam of the level $P_E$, the recorded amorphous recording mark 9 is transformed to the crystalline phase, thus erasing information. The portion irradiated with the beam of the level $P_W$ is transformed to the amorphous phase, thus forming the recording mark 9.

REPRODUCTION

When information is to be reproduced, a laser beam having a lower power level than $P_E$ is radiated onto the recording layer 3, and the difference between reflected light intensities of the recording mark 9 and the non-recorded portion is detected by a photoelectric transducer.

EXPERIMENTAL EXAMPLES

Experimental examples will be described below, wherein optical disks were manufactured according to the present invention, and the overwrite characteristics of the disks were evaluated.

EXPERIMENTAL EXAMPLE 1

A grooved polycarbonate 5" disk-like substrate was set in a vacuum chamber of a three-element sputtering apparatus, and a radio-frequency (R.F.) power was applied to an $SiO_2$ target to perform argon gas sputtering. As a result, a 600 Å thick $SiO_2$ film was formed as a protective layer on the substrate.

An R.F. power was applied to an $In_{50}Sb_{50}$ intermetallic compound target and a pure Te target to perform co-sputtering in an argon gas, thus forming a 400-Å thick recording layer. In this case, the R.F. power was adjusted in advance so that the recording layer had a predetermined composition represented by $(In_{100-x}Sb_x)_{100-y}Te_y$.

Thereafter, argon sputtering of an $SiO_2$ target was performed again, thereby forming a 600-Å thick $SiO_2$ protective layer on the recording layer.

An R.F. power was then applied to an Au target to perform argon sputtering. Thus, a 200 Å thick Au reflection layer for enhancing a reproduction signal was formed on the $SiO_2$ protective layer.

Thereafter, the disk was removed from the sputtering apparatus, and was set on a spinner. An ultraviolet-curable resin was coated on the disk to have a thickness of about 10 μm. Ultraviolet rays were radiated onto the applied resin to cure it, thus forming a resin layer.

In this manner, the composition of the recording layer was changed to prepare a plurality of optical disk samples. The compositions of the recording layers are as follows:

Sample A Group: $(In_{50}Sb_{50})_{100-y}Te_y$
 (y=20, 25, 30, 35, 45, 50)
Sample B Group: $(In_{55}Sb_{45})_{100-y}Te_y$
 (y=20, 25, 30, 35, 45, 50)
Sample C Group: $(In_{52}Sb_{48})_{100-y}Te_y$
 (y=20, 25, 30, 35, 45, 50)
Sample D Group: $(In_{48}Sb_{52})_{100-y}Te_y$ (y=20, 25, 30, 35, 45, 50)

Sample E Group: $(In_{45}Sb_{55})_{100-y}Te_y$ (y=20, 25, 30, 35, 45, 50)

Note that these 35 sample disks were prepared under the same conditions except for the compositions of their recording layers.

The dynamic characteristics of these samples were evaluated in the following procedures while rotating the samples at 1,800 r.p.m.

(a) A track of the recording layer which was amorphous as deposited was transformed to a crystalline state by radiating a continuous laser beam having a power of 14 mW onto the surface of the recording layer. In this case, the same track was scanned three times with the laser beam in order to fully transform this portion to its crystalline phase.

(b) The first recording was performed by a pulse laser having an overwrite waveform as shown in FIG. 3. In this case, information was recorded on the crystalline track by a recording pulse having a power of 18 mW, a frequency of 4 MHz, and a duty ratio of 50%. Note that the erasure biasing power was set at 14 mW.

After recording, a 0.8 mW reproduction laser beam was radiated onto the groove of the recording layer to reproduce the recorded information. The reproduction signal was A/D-converted, and the C/N value of the digital signal was measured by a spectrum analyzer.

(c) A pulse laser with the same overwrite waveform as mentioned above except for the frequency of the recording pulse, which was changed to 5 MHz was radiated onto the groove subjected to the first recording, thus performing an overwrite operation.

After the overwrite operation, a 0.8 mW reproduction laser beam was radiated onto the groove of the recording layer again to reproduce the recorded information. The reproduction signal was A/D-converted, and the C/N value of the digital signal was measured by the spectrum analyzer, then the C/N value of a recording mark at the previous frequency of 4 MHz and the degree of erasure of the previous recording mark were measured. FIGS. 4 to 8 show the measurement results.

FIGS. 4 to 8 are graphs showing the relationships between Te contents and C/N values, and degrees of erasure of the A to E groups, in which the abscissa represents the Te content, the left ordinate and unbroken line represent the C/N value, and the right ordinate and broken line represent the degree of erasure.

Figure 9A:
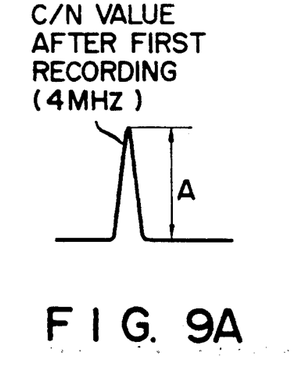
FIGS. 9A and 9B are charts for explaining the C/N value and degree of erasure in an overwrite operation.
Figure 9B:
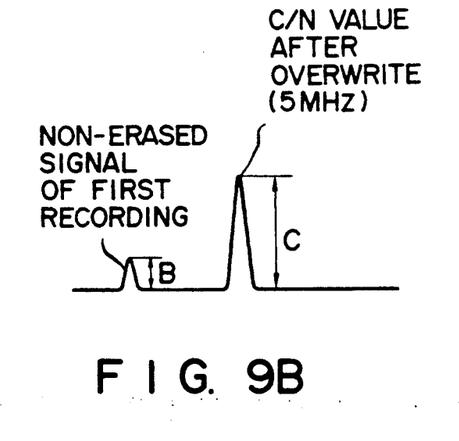

The C/N value and the degree of erasure will be explained below with reference to FIGS. 9A and 9B. Assume that the C/N value of a reproduction signal after the first recording (4 MHz) is represented by A, as shown in FIG. 9A, the C/N value of a reproduction signal after the overwrite operation (5 MHz) is represented by C, as shown in FIG. 9B, and the C/N value of a non-erased signal of the first recording, which is not erased after the overwrite operation, is represented by B. In this case, B-A corresponds to the degree of erasure, and C corresponds to the C/N value.

In FIGS. 4 to 8, when the C/N value is equal to or higher than 30 dB and the degree of erasure is equal to or lower than −20 dB, it is determined that the overwrite characteristics are good; otherwise, the overwrite characteristics are insufficient. In the composition chart of FIG. 10, compositions whose characteristics are good are indicated by the mark "○", and compositions whose characteristics are insufficient are indicated by the mark "x".

Figure 10:
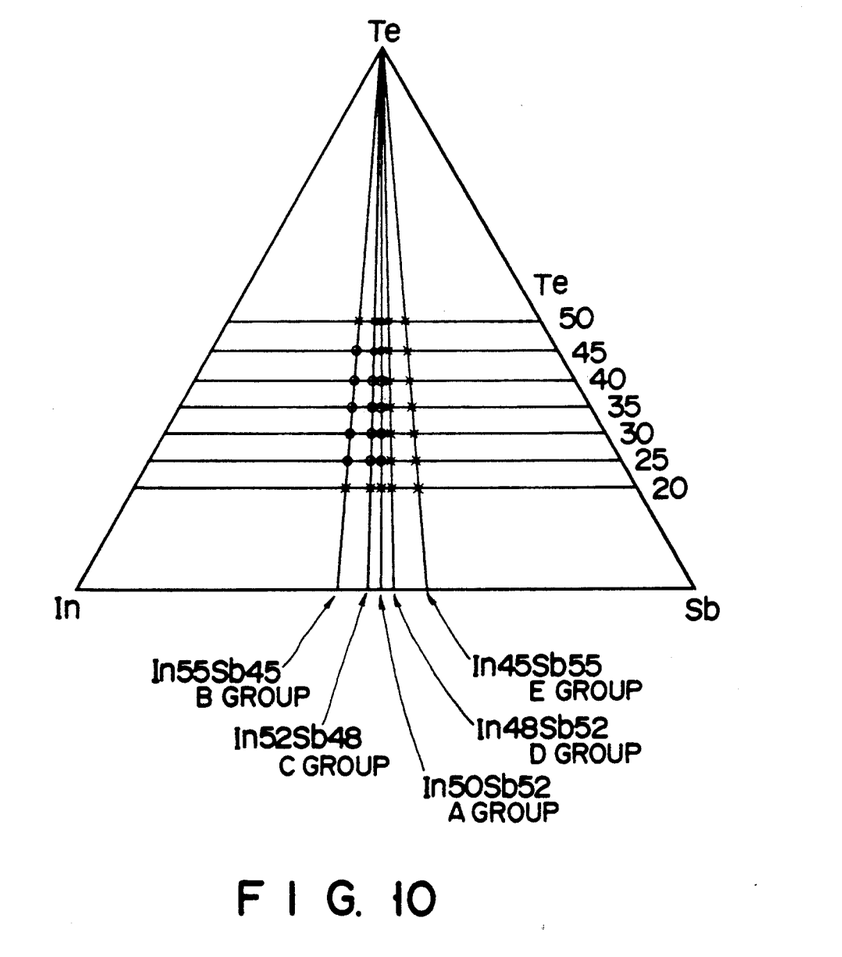
FIG. 10 is an In-Sb-Te composition chart comparing good and poor overwrite characteristics.
Figure 11:
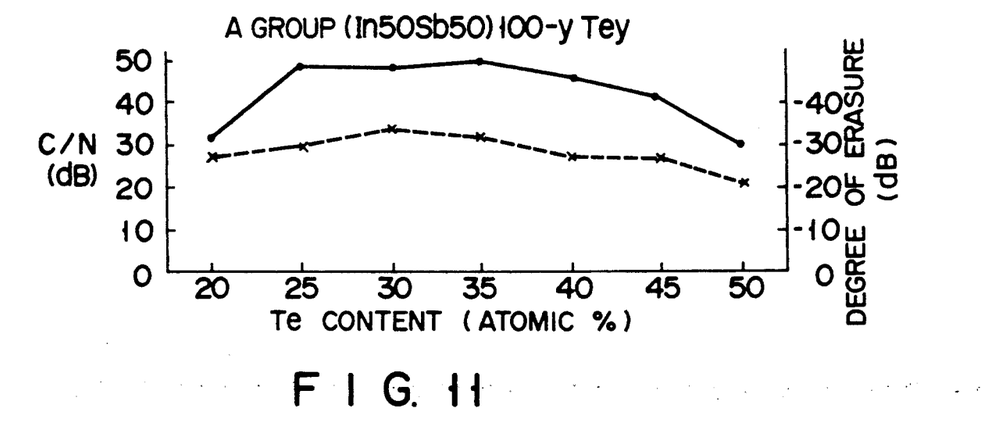
FIGS. 11 to 15 are graphs showing the relationships between recording layer compositions and overwrite characteristics in Experimental Example 2.
Figure 12:
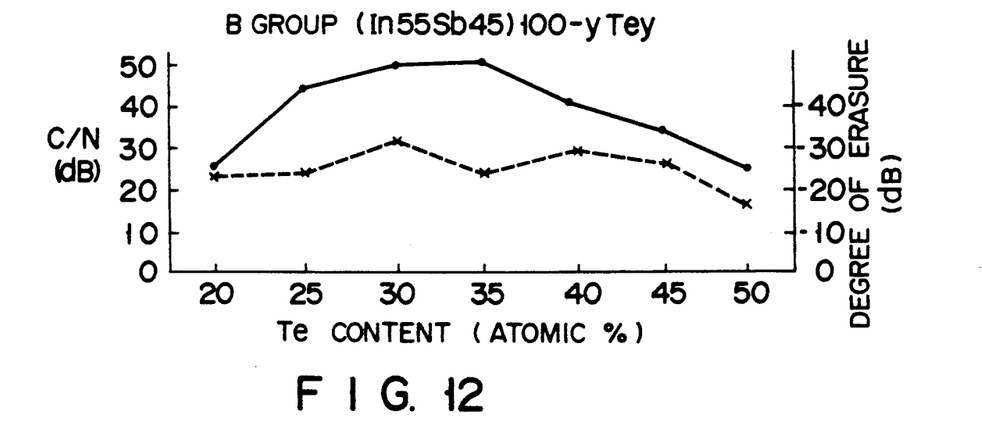
Figure 13:
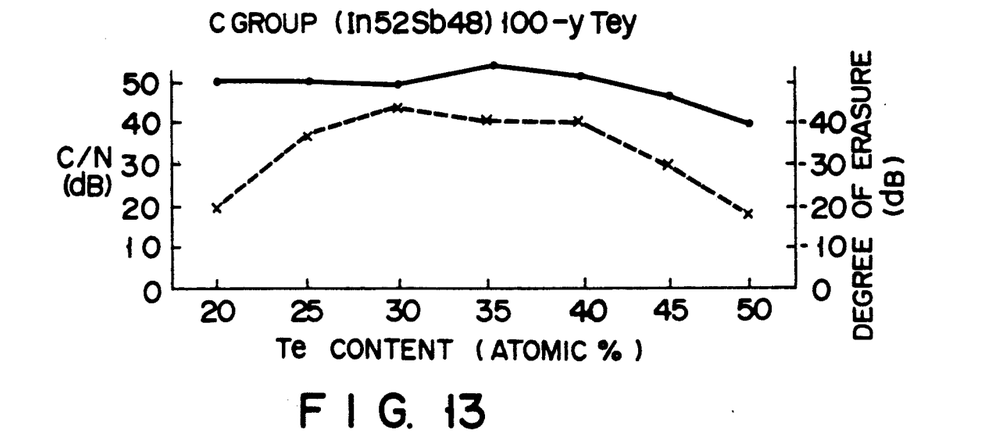
Figure 14:
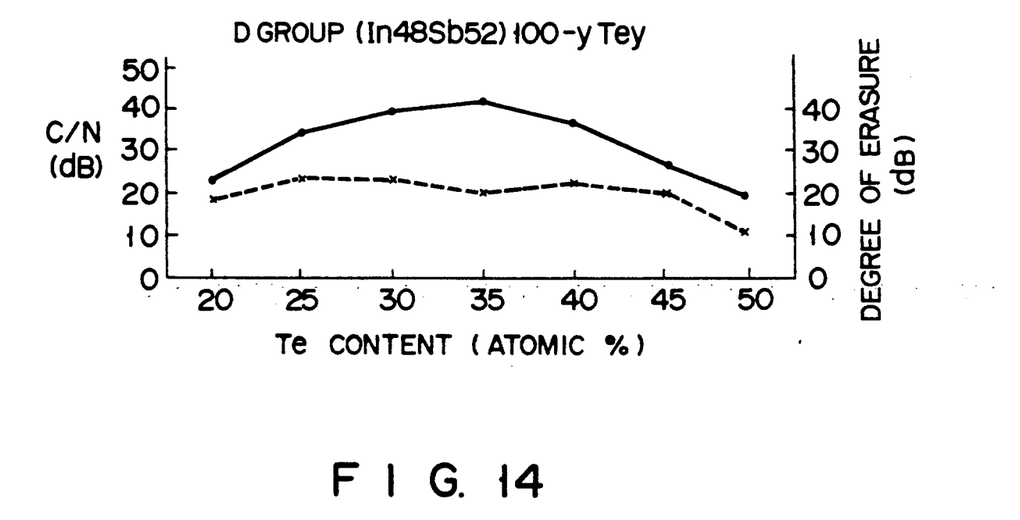
Figure 15:
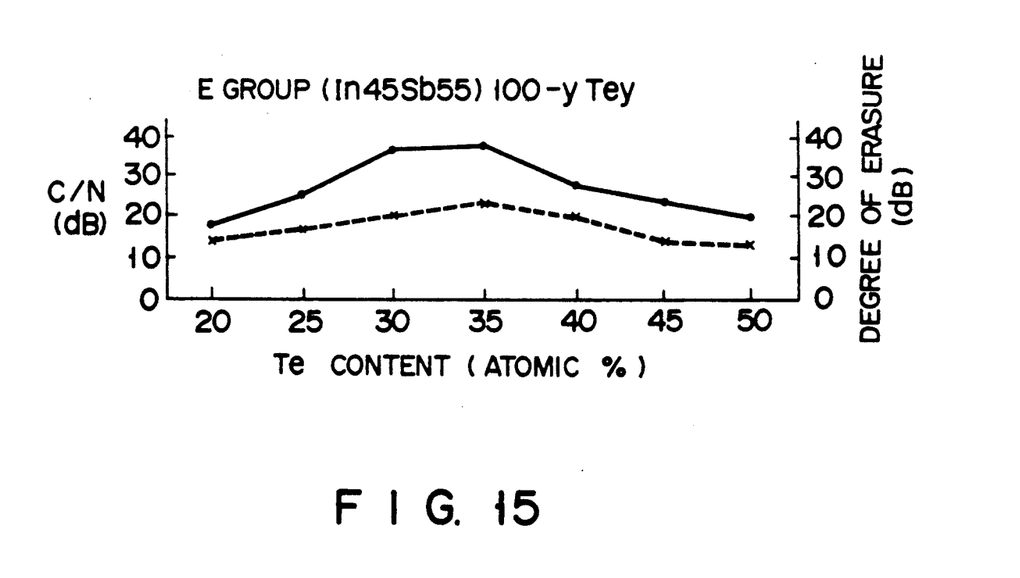
Figure 16:
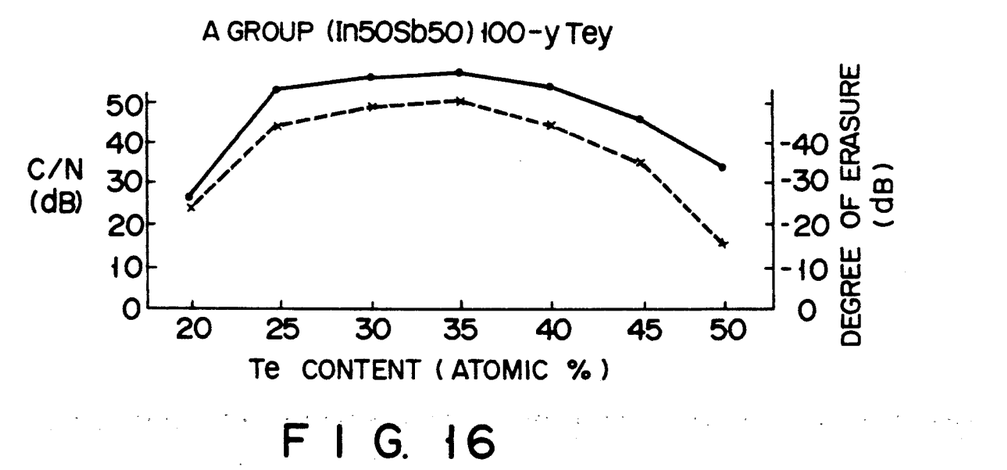
FIGS. 16 to 20 are graphs showing the relationships between recording layer compositions and overwrite characteristics in Experimental Example 3.
Figure 17:
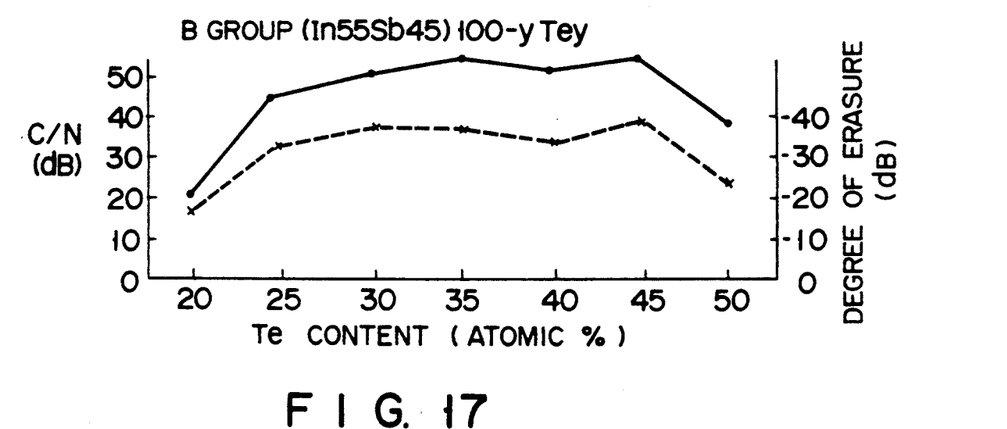
Figure 18:
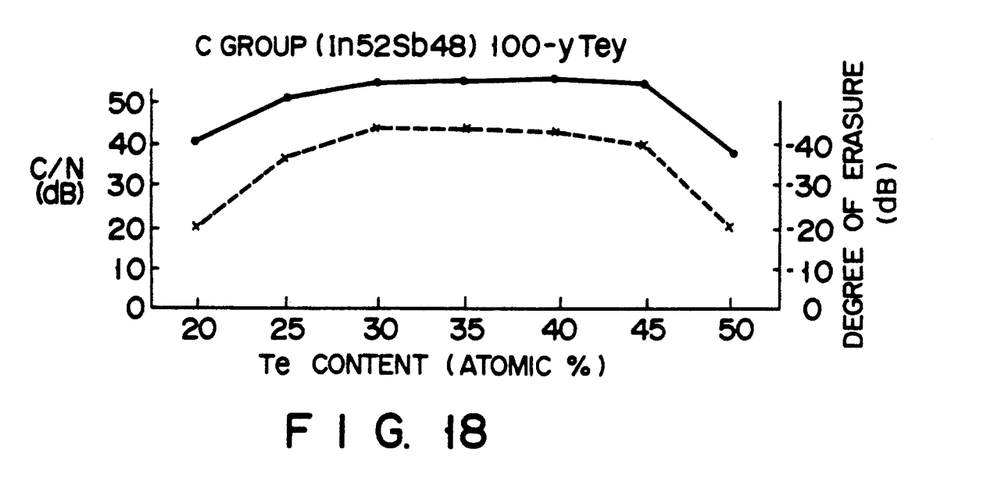
Figure 19:
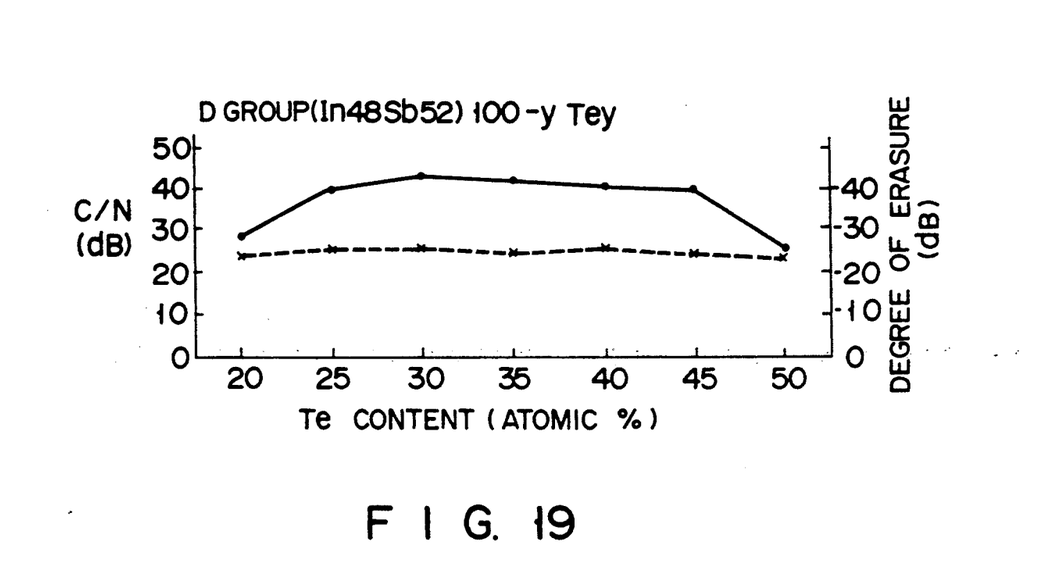
Figure 20:
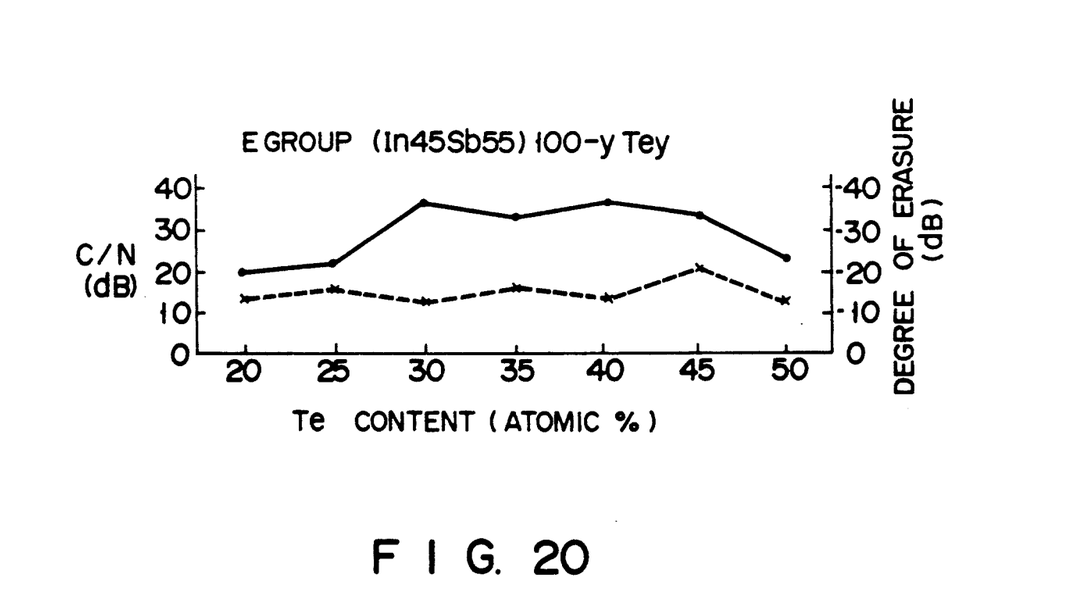

As is apparent from FIG. 10, if the composition of the recording layer was represented by $(In_{100-x}Sb_x)_{100-y}Te_y$, and $45 \leq x \leq 50$ and $25 \leq y \leq 45$, good overwrite characteristics can be obtained.

EXPERIMENTAL EXAMPLE 2

Thirty-five optical disk samples were prepared following the same procedures as for those in Experimental Example 1, except that the two $SiO_2$ layers serving as the protective layers were replaced with 400-Å thick $Al_2O_3$ layers.

The dynamic characteristics of these samples were evaluated under the same conditions as in Experimental Example 1. FIGS. 11 to 15 show the evaluation results.

FIGS. 11 to 15 are graphs showing the relationships between Te contents, C/N values and degrees of erasure of the A to E groups, in which the abscissa represents the Te content, the left ordinate and unbroken line represent the C/N value and the right ordinate and broken line represent the degree of erasure. As can be seen from these graphs, in a recording layer the composition of which is represented by $(In_{100-x}Sb_x)_{100-y}Te_y$, good overwrite characteristics can be obtained within the ranges of $45 \leq x \leq 50$ and $25 \leq y \leq 45$ as in Experimental Example 1. The C/N value and the degree of erasure in this composition range were improved from those in Experimental Example 1. Thus, the superiority of use of $Al_2O_3$ as a protective layer was demonstrated.

EXPERIMENTAL EXAMPLE 3

Thirty-five optical disk samples were prepared following the same procedures as in Test Example 1, except that the two $SiO_2$ layers serving as the protective layers were replaced with 500-Å thick $CeO_2$ layers.

The dynamic characteristics of these samples were evaluated under the same conditions as in Experimental Example 1. FIGS. 16 to 20 show the evaluation results.

FIGS. 16 to 20 are graphs showing the relationships between Te contents, C/N values and degrees of erasure of the A to E groups, in which the abscissa represents the Te content, the left ordinate and unbroken line represent the C/N value and the right ordinate and broken line represent the degree of erasure.

As can be seen from these graphs, in a recording layer the composition of which is represented by $(In_{100-x}Sb_x)_{100-y}Te_y$, good overwrite characteristics can be obtained within the ranges of $45 \leq x \leq 50$ and $25 \leq y \leq 45$ as in Experimental Example 1. The C/N value and the degree of erasure in this composition range were improved from those in Experimental Example 1. Thus, the superiority of $CeO_2$ as a protective layer was demonstrated.

What is claimed is:

1. An information storage medium comprising:
    a substrate; and
    a recording layer supported on said substrate and subjected to reversible and selective phase transformation between a crystalline phase and an amorphous phase, by changing the conditions under which a light beam is radiated,
    said recording layer consisting essentially of an alloy represented by $(In_{100-x}Sb_x)_{100-y}Te_y$ where x and y are in atomic %, $45 \leq x \leq 50$, and $25 \leq y \leq 45$.

2. The information storage medium according to claim 1, further comprising an inorganic protective layer provided between said substrate and said recording layer.

3. The information storage medium according to claim 2, further comprising a reflection layer provided on said inorganic protective layer disposed on said recording layer.

4. The information storage medium according to claim 2, further comprising an inorganic protective layer on said recording layer.

5. The information storage medium according to claim 4, further comprising an organic protective layer provided on said inorganic protective overlying said recording layer.

6. The information storage medium according to claim 5, further comprising a reflection layer provided between said inorganic protective layer, disposed on said recording layer, and said organic protective layer.

7. The information storage medium according to claim 1, further comprising an organic protective layer provided on said recording layer.

8. An information storage medium comprising:
   a substrate; and
   a recording layer supported on said substrate and subjected to reversible and selective phase transformation between a crystalline phase and an amorphous phase, by changing the conditions under which a light beam is radiated; and
   an inorganic thermal controlling layer for controlling the temperature of said recording layer, said layer being situated either (1) between said substrate and said recording layer or (2) on said recording layer, said recording layer consisting essentially of an alloy represented by $(In_{100-x}Sb_x)_{100-y}Te_y$, where x and y are in atomic %, $45 \leq x \leq 50$, and $25 \leq y \leq 45$, and said protective layer having a heat conductivity of not less than $\frac{1}{4}$ of that of said recording layer.

9. The information storage medium according to claim 8, wherein said protective layer contains at least one material selected from the group consisting of $MgF_2$, $Al_2O_3$, and AlN.

10. The information storage medium according to claim 8, further comprising an inorganic protective layer on said recording layer having a heat conductivity of not less than $\frac{1}{4}$ of that of said recording layer.

11. The information storage medium according to claim 10, wherein said protective layers contain at least one material selected from the group consisting of $MgF_2$, $Al_2O_3$, and AlN.

12. The information storage medium according to claim 10, further comprising an organic protective layer provided on said inorganic protective layer overlying said recording layer.

13. The information storage medium according to claim 12, further comprising a refection layer provided between said inorganic protective layer, disposed on said recording layer, and said organic protective layer.

14. The information storage medium according to claim 10, further comprising a reflection layer provided on said inorganic protective layer on said recording layer.

15. An information storage medium comprising:
   a substrate; and
   a recording layer supported on said substrate and subjected to reversible and selective phase transformation between a crystalline phase and an amorphous phase, by changing the conditions under which a light beam is radiated; and
   an inorganic thermal controlling layer provided between said substrate and said recording layer for controlling the temperature of said recording layer, said recording layer consisting essentially of an alloy represented by $(In_{100-x}Sb_x)_{100-y}Te_y$, where x and y are in atomic %, $45 \leq x \leq 50$, and $25 \leq y \leq 45$, and said protective layer containing crystalline material.

16. The information storage medium according to claim 15, wherein said protective layer contains at least one material selected from the group consisting of $CeO_2$, PbO, ZnS, and $MgF_2$.

17. The information storage medium according to claim 15, further comprising an inorganic protective layer containing crystalline material formed on said recording layer.

18. The information storage medium according to claim 17, wherein said protective layers contain at least one material selected from the group consisting of $CeO_2$, PbO, ZnS and $MgF_2$.

19. The information storage medium according to claim 17, further comprising an organic protective layer provided on said inorganic protective layer overlying said recording layer.

20. The information storage medium according to claim 19, further comprising a reflection layer provided between said inorganic protective layer, disposed on said recording layer, and said organic protective layer.

21. The information storage medium according to claim 17, further comprising a reflection layer provided on said inorganic protective layer on said recording layer.

* * * * *